United States Patent Office 3,435,666
Patented Apr. 1, 1969

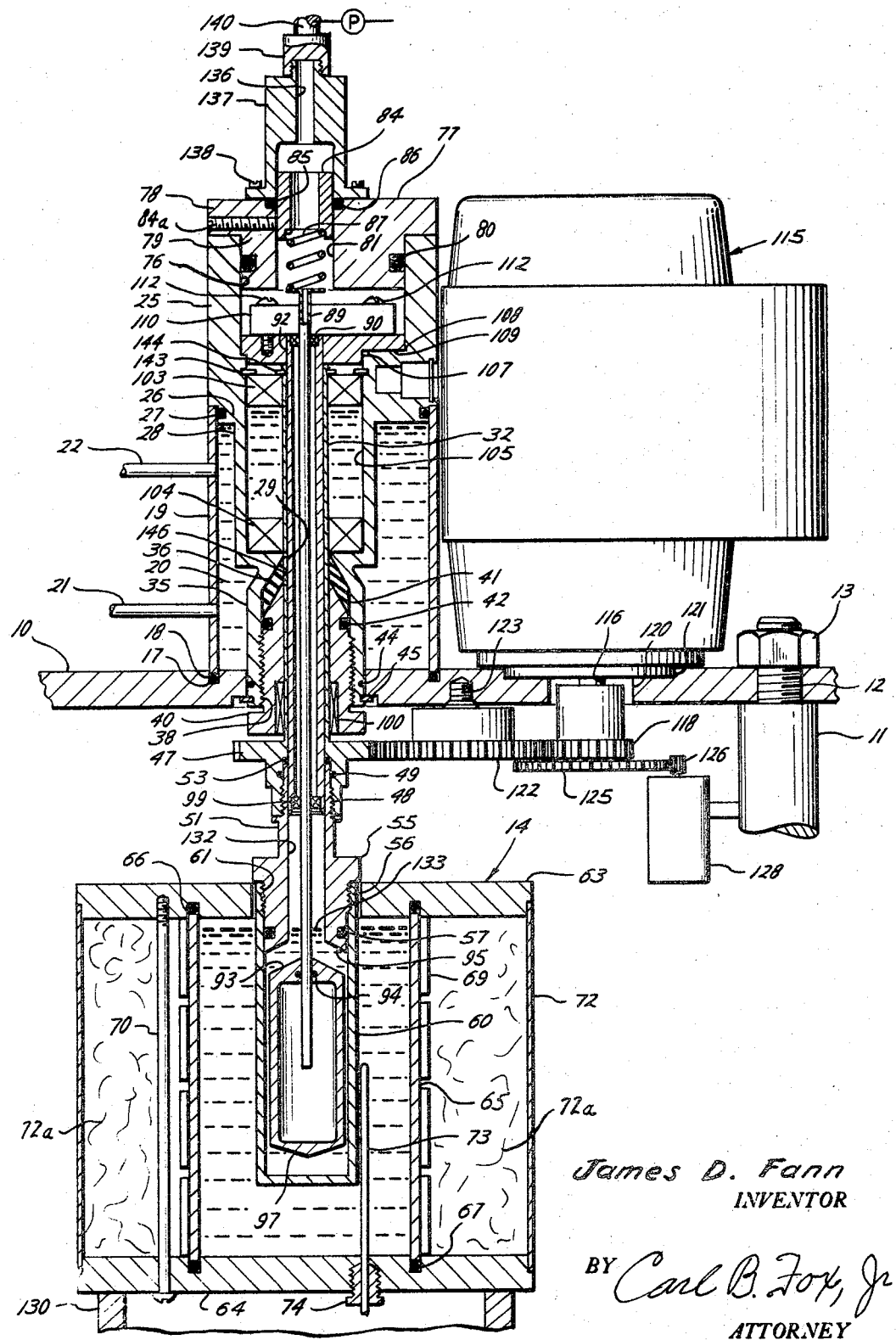

3,435,666
VISCOMETER
James D. Fann, Simonton, Tex., assignor to Champion Laboratories, Inc., West Salem, Ill., a corporation of Connecticut
Filed July 18, 1966, Ser. No. 566,130
Int. Cl. G01n 11/00
U.S. Cl. 73—60                               7 Claims

ABSTRACT OF THE DISCLOSURE

Viscometer of the type wherein viscosity is determined by measurement of shear forces in a fluid by relative rotation of a cylinder in close proximity to a surrounding cylinder wall, there being a pressurable fluid above the fluid the viscosity of which is to be measured to prevent evaporations therefrom.

---

A principal object of the invention is to provide an improved viscometer.

An additional object of the invention is to provide viscometers wherein viscosities are determined under conditions closely simulating down-hole conditions, and utilizing completely liquid-filled systems, whereby boiling of the sample does not occur.

There are a number of types of apparatuses which have been used for determining the viscosities of fluids. In some, the determination is made by measurement of the force for turning a propeller, or the like, through the fluid. In others, the viscosity is determined by measurement of shear forces in the fluid by rotation of a cylinder in close proximity to a surrounding cylindrical wall. This apparatus is of the latter type.

When boiling of a drilling fluid sample occurs prior to or during a viscosity determination, water is lost from the sample and its viscosity changes because of the change in its water content. During operation of the apparatus according to this invention, the sample is covered by an oil layer or by a layer of another liquid, and may be kept under pressure, which effectively prevents evaporation from the sample even when the determinations are made at relatively high temperatures, e.g. 500° F. or even higher. The pressures and temperatures may be varied to obtain complete viscosity information for a fluid under various conditions. In the description following; the layer above the sample is referred to as an oil layer, but it is to be understood that liquid materials other than oil may be employed for this purpose. The liquid should, of course, not spontaneously dissolve into or mix with the sample, and should have a specific gravity lower than the specific gravity of the sample.

Other objects and advantages of the invention will appear from the following detailed description of a preferred embodiment thereof, reference being made to the accompanying drawing which is an axial vertical cross sectional view of the apparatus in a preferred form.

Referring now to the drawing in detail, a horizontally disposed plate 10 is supported by a plurality of spaced vertical bolts or posts 11. Posts 11 have reduced threaded end portions 12 received through suitable openings in plate 10 and nuts 13 are screwed thereon. The lower ends of posts 11 are suitably affixed to a support or surface (not shown) in the same or another suitable manner. The supporting posts 11, at least three in number, are most suitably disposed at opposed sides of heating assembly 14.

In its upper surface, plate 10 has a circular ring groove 17 in which is disposed an O-ring seal 18 and the lower end of a cylindrical tube or shell 19 the interior of which forms a water (or other liquid) bath 20. Tubes or conduits 21, 22 fixed about openings through the side wall of sleeve 19 provide an inlet and an outlet for circulation of water or other fluid to the bath.

Body 25 has a cylindrical upper portion and a reduced portion 26 therearound received within the upper end of sleeve 19. An O-ring seal 27 seals between body 25 and the interior of sleeve 19 as shown in the drawing. Body 25 is of the same exterior diameter as sleeve 19.

Body 25 has an eccentric tubular or sleeve-like lower formation 28 which extends into bath 20. The lower end of formation 28 has an opening 29 through which extends a sleeve or tube 32 forming the main shaft of the apparatus. Below formation 28, body 25 has a still lower tubular formation 35 of reduced diameter, the upper end of which is upwardly and inwardly conically tapered or flared as at 36 to provide a sealing surface. The lower end of formation 35 is threaded at 38 to form a socket. A packing gland 40 having a conically tapered end to engage against packing 41 is screwed into socket 38. An O-ring seal 42 is provided about gland 40 between its threads and its conical end. Packing 41 is of the chevron form shown in the drawing.

An O-ring seal 44 is provided to seal between body portion 35 and plate 10, the body portion extending through a close fitting hole through the plate. A snap ring 45 is received in an encircling groove about the lower end of body portion 35 to retain the body portion against upward movement. The snap ring is disposed in a recess in the lower surface of plate 10.

Shaft 32 terminates at its lower end in an integral gear 47 concentric therewith, and therebelow there is provided an integral threaded socket 48 having an interior O-ring seal 49 above the threads. A fitting 51 has upper threads screwed into socket 48 and thereabove is sealed around by O-ring seal 49 and a centralizing ring 53. At its lower end, member 51 is enlarged at 55 and has reduced diameter threads 56 below the enlargement. An O-ring seal 57 is provided below the threads. A sample cup 60 has upper interior threads 61 screwed onto threads 56.

Sample cup 60, in the form of a cylindrical vessel, is received within heating assembly 14. Assembly 14 may also be used to cool the sample, by filling it with ice, Dry Ice, and/or salt solution. Assembly 14 includes an upper plate 63, a lower plate 64, and a tubular sleeve 65, the upper and lower ends of which are received in circular grooves in the facing surfaces of the plates. O-ring seals are disposed in the grooves at the ends of the sleeve 65. Heating elements 69 are disposed about the outer surface of sleeve 65, being connected (not shown) to a suitable electrical supply in order to provide heating. A plurality of screws 70 are each received through a hole through plate 64 and are screwed at their upper ends into tapped openings in plate 63. These screws 70 securely hold plates 63, 64 in connected relation with sleeve 65 in place as described. An outer circular sleeve 72 has its upper and lower ends in outward circular recesses of plates 63, 64, and reduces heat losses from the heater 69, and contact therewith. The annular space between sleeves 65, 72 is filled with insulation 72a.

A temperature measuring device 73, e.g. a thermocouple is mounted through a plug 74 screwed into a tapped port through plate 64, the thermocouple extending to adjacent sample cup 60.

Temperature indicators may be included at other locations in the equipment, e.g. a thermocouple may be inserted downwardly through spindle 89 to terminate above the sample holder.

Body 25, at its upper end, terminates in an eccentric upwardly-opening cylindrical chamber 76 which is closed by closure 77 having an upper flange 78 resting on the upper edge of body 25 and having a lower reduced portion 79 extending into chamber 76. An O-ring seal 80 is disposed in a groove about closure 77 to seal between the closure and body 25. Closure 77 has an eccentric passage 81 therethrough aligned with sample cup 60. A ring-shaped fitting 84 has therearound at its outer surface and O-ring seal 86 which is seated in a recess 85 around the upper end of passage 81. Setscrew 84a through flange 78 holds fitting 84 in place. A helical spring 87 is fixed to fitting 84, and extends downwardly therefrom through passage 81 to be fixed to the upper end flange of spindle element 89. Spindle 89 extends downwardly concentrically within pipe or tube 92, which lines shaft 32, to a threaded connection with element 93.

A bearing 90 is supported in an interior recess at the upper end of tube 92, in contact with spindle 89.

The hollow generally cylindrical element 93 is frictionally connected to the lower end of spindle 89 through a central axial opening in its upper end, there being an O-ring seal therebetween. The upper end of element 93 is conical, of the same angle as conical surface 95 of the interior of the sample cup, this surface 95 being at the lower end of fitting 51. The lower end of element 93 is conically formed at 97. Element 93 is hollow as shown in the drawing.

Spindle 89 and element 93 together form an inner coaxial element within sample cup 60, fitting 51, and sleeve 32, fitting 51 and sleeve 32 together forming a coaxial element extending above the cylindrical vessel forming sample cup 60.

At its lower end, tube 92 carries a bearing 99 through which spindle 89 extends. Gland 40 has needle bearing 100 in an interior recess at its lower end. Upper and lower bearings 103, 104 are provided at the upper and lower ends, respectively, of annular chamber 105 which is located above packing 41 and below chamber 76. Head 107, the lower portion of which is cylindrical and the upper portion of which is eccentric at 108, is supported on a shoulder 109 forming the bottom of chamber 76.

A transducer 110 (strain gage) is mounted on the upper surface of head 107 by screws 112. The strain gage measures the torque imposed on spindle 89 by relative rotations between element 93 and sample cup 60, as will be further described. This measurement gives information directly related to viscosity of the fluid in the sample cup, in the usual manner.

The drive 115 for causing rotation of sample cup 60 includes an electric motor and a variable speed transmission, such as, for example, a "Graham" transmission. Rotating shaft 116 of the drive has at its lower end a circular gear 118. The drive is mounted upon the upper surface of plate 10, with shaft 116 extending through a circular hole 120 and the lower reduced end portion of the drive being seated in a recess 121. The drive is secured to plate 10 by screws, not shown.

Gear 118 engages a circular gear 122 which in turn engages gear 47, previously mentioned. Gear 122 is mounted at the lower surface of plate 10 by screw formation 123 screwed into a tapped opening of the plate. Shaft 116 carries, below gear 118, a gear 125 which is engaged with smaller gear 126 carried on the shaft of tachometer 128. Tachometer 128 is supported by post 11, or otherwise supported in suitable manner. Tachometer 128 indicates the speed at which the sample cup is rotated.

Sleeve 65 surrounding sample cup 60 is filled with oil or other material suitable for heating or cooling the sample cup and sample to control their temperatures.

Plate 64 is supported upon a support ring 130 which is set upon the plate or other support to which screws 11 are secured. With ring 130 removed, bath 14 may be lowered to unscrew the sample cup at its upper socket 61. Fitting 51 may also be unscrewed at threads 48 if necessary for cleaning, or the like.

The liquid the viscosity of which is to be determined is placed in the sample cup to a level so that its upper surface will be preferably in a lower portion of the passage 132 of fitting 51. For example, the sample may have its upper level at 133. Usually, when a sample is heated, its volume increases and level 133 may move upwardly in passage 132 as a result of the expansion. Such changes in the upward level of the sample have little or no effect on the viscosity determinations. Next, the interior of the apparatus is filled with oil or the like, this being done through passage 136 of a fitting 137 secured by screws 138 around the upper end of ring 84 at its connection into passage 81. A connection fitting 139 screws onto the upper nipple of fitting 137 to connect tube or conduit 140 thereto. Tube 140 is connected to the output of a pressure pump so that pressure may be maintained on the sample.

Snap ring 143 retains bearing 103 in place in chamber 105. Snap ring 144 holds tubular shaft 32 against downward pressures. A small hole or opening 146 through the wall of sleeve 32 adjacent packing 41 permits oil to seep to the packing to prevent it becoming overheated and destroyed.

The oil completely fills chamber 105 as well as the small annular space between shaft 32 and tube 92, so that the apparatus is completely filled with oil above the sample which completely eliminates boiling of and evaporation from the sample during the determinations and enables pressuring of the samples during the determinations. The pressure pump connected to conduit 140 applies suitable pressure to the oil, and in turn to the sample in the sample cup so that determinations may be made at any desired pressures.

The liquid within sleeve 19, forming the cooling bath 20, maintains the upper portions of the equipment under cool conditions to prevent unnecessary wear on the parts thereof. With the heater 69 set at the proper temperature, the oil or other liquid within sleeve 65 is heated to heat the sample. Rotation of gear 47 by the drive rotates shaft 32 together with fitting 51 and sample cup 60. The spindle 89 does not rotate with these elements, except for a few degrees as torque is imposed on transducer 110.

While a preferred embodiment of the invention has been shown and described, many modifications thereof may be made by persons skilled in the art without departing from the spirit of the invention.

I claim:

1. Viscometer, comprising cylindrical vessel means forming a sample cup having its axis disposed vertically, first coaxial means extending upwardly from within said vessel means to above said vessel means, second coaxial means extending upwardly from said vessel means to above said vessel means spaced outwardly around said first coaxial means, means for rotating said vessel means and second coaxial means, and means for determining the shear forces imposed on said first coaxial means by rotation of said vessel means and second coaxial means, said vessel means being filled with a liquid sample and said second coaxial means being filled with a seal liquid above said liquid sample, whereby evaporation from the liquid sample may be prevented by pressure imparted through said seal liquid to said liquid sample.

2. Combination of claim 1, including means for pressuring said seal liquid to impart pressures to the liquid sample.

3. Combination of claim 2, including means for regulating the temperature of said vessel and the sample therein to desired temperatures.

4. Combination of claim 3, said first coaxial means having enlarged coaxial cylindrical means at its lower end closely spaced inwardly from said second coaxial means, said second coaxial means being enlarged at its lower end and closed by said vessel means.

5. Combination of claim 4, said first coaxial means being releasably connected to said enlarged coaxial cylindrical means and said second coaxial means being releasably connected to said enlarged lower end and vessel, said second coaxial means including surrounding concentric gear means and variable speed drive means engaged therewith.

6. Combination of claim 5, including heated bath means disposed to removably surround said cylindrical vessel, and including cooling bath means disposed to surround at least portions of said first and second coaxial means above their said lower end enlargements.

7. Combination of claim 6, said means for determining shear forces comprising a strain gage connected to the upper end of said first coaxial means and immersed in said seal liquid.

References Cited

UNITED STATES PATENTS 2,491,639  12/1949  Bechtel et al. _____ 73—59
3,349,606  10/1967  Merrill et al. _____ 73—60

OTHER REFERENCES

Harper, John C.: Coaxial Cylinder Viscometer for Non-Newtonian Fluids, in Review of Scientific Instruments, 32(4), pp. 425–428, April 1961.

LOUIS R. PRINCE, Primary Examiner.

JOSEPH W. ROSKOS, Assistant Examiner.

U.S. Cl. X.R.

73—59

UNITED STATES PATENT OFFICE
CERTIFICATE OF CORRECTION

Patent No. 3,435.666                                April 1, 1969

James D. Fann

It is certified that error appears in the above identified patent and that said Letters Patent are hereby corrected as shown below:

Column 1, lines 3-5, delete the following: --assignor to Champion Laboratories, Inc., West Salem, Ill., a corporation of Connecticut --.

Signed and sealed this 25th day of November 1969.

(SEAL)
Attest:

Edward M. Fletcher, Jr.
Attesting Officer

WILLIAM E. SCHUYLER, J.
Commissioner of Patent